(12) United States Patent
Aach et al.

(10) Patent No.: US 6,252,931 B1
(45) Date of Patent: Jun. 26, 2001

(54) PROCESSING METHOD FOR AN ORIGINAL IMAGE

(75) Inventors: Til Aach, Lübeck; Thorsten Buzug, Kiel; Martin Stahl, Kaltenkirchen; Thomas Pralow, Buchholz; Ingo Maack, Norderstedt; Ansgar Springub, Hamburg, all of (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/425,653

(22) Filed: Oct. 22, 1999

(30) Foreign Application Priority Data

Oct. 24, 1998 (DE) .............................................. 198 49 090

(51) Int. Cl.$^7$ ..................................................... H05G 1/64
(52) U.S. Cl. ........................................... 378/98.2; 382/274
(58) Field of Search ........................... 378/98.2, 19, 148, 378/98, 62, 111, 106; 250/370; 348/678; 382/274, 128, 132, 299

(56) References Cited

U.S. PATENT DOCUMENTS

| | | | |
|---|---|---|---|
| 5,440,607 | * 8/1995 | Nakaya ................................ 378/98.2 |
| 5,485,500 | * 1/1996 | Baba et al. ........................... 378/98.2 |
| 5,546,440 | * 8/1996 | Nakatani et al. ..................... 378/98.2 |
| 5,546,473 | * 8/1996 | Buytaert et al. ..................... 382/132 |
| 5,644,662 | 7/1997 | Vuylsteke ............................. 382/302 |
| 5,717,791 | * 2/1998 | Laebaere et al. .................... 382/274 |
| 5,787,146 | * 7/1998 | Giebeler ................................ 378/82 |

FOREIGN PATENT DOCUMENTS

| | | | |
|---|---|---|---|
| 0527525A2 | 2/1993 | (EP) | ............................... G06F/15/68 |
| 0527525A3 | 2/1993 | (EP) | ............................... G06F/15/68 |
| 6-114046 | * 4/1994 | (JP) | .................................... 378/98.2 |

* cited by examiner

Primary Examiner—Robert H. Kim
Assistant Examiner—Irakli Kiknadze
(74) Attorney, Agent, or Firm—John F. Vodopia

(57) ABSTRACT

The invention relates to an image processing method in which an original image is first decomposed into a series of detail images, with each of which there is associated a respective spatial frequency range, low contrasts being enhanced before assembly of a final image from the images which are produced by the decomposition and are subsequently modified. The modification of the detail images is performed in dependence on the relevant image value as well as in dependence on the mean image value and/or the variation of the image values in a window around the relevant pixel.

6 Claims, 4 Drawing Sheets

PROCESSING METHOD FOR AN ORIGINAL IMAGE

BACKGROUND OF THE INVENTION

1. Field of the Invention

The invention relates to a method for processing an original image, which method includes the following steps: decomposition of the original image into a series of detail images, each of which contains only a part of the spatial frequencies of the original image, modification of at least a part of the image values associated with the pixels of at least one of the detail images, reconstruction of a final image from the possibly filtered detail images.

2. Description of Related Art

The original image may be an X-ray image, but it is also possible to process other images produced for medical diagnostics and available an electronic form, in which an image value which characterizes the brightness in the relevant pixel is associated with each pixel (a pixel is an image element; an image is composed of a matrix of pixels). The invention also relates to a device for carrying out such a method.

A method of the kind set forth is known from EP-A 527 525. According to the known method the original image is subjected to low-pass filtering at a first decomposition level and the low-pass image thus formed is subtracted from the original image, thus yielding a difference image which is referred to as a first detail image in which only the very highest spatial frequencies of the original image are preserved. Because of the subtraction of the low-pass image from the original image, positive as well as negative values may occur for pixels in the detail image. These values represent the contrast of the image; however, hereinafter they are also referred to as image values.

At a second decomposition level the low-pass image is subjected to a further low-pass filtering operation, thus producing a second low-pass image which, in relation to the original image, represents spatial frequency components which are less high than those represented by the first low-pass image. The second low-pass image is subtracted from the first low-pass image, thus yielding a second detail image which represents mainly spatial frequencies which lie below the spatial frequency band of the first detail image but above the spatial frequency range of the second low-pass image.

At a third decomposition level a third low-pass image containing even less high frequency spatial frequency components is formed from the second low-pass image in an analogous manner and a third detail image is derived from the difference between the second and the third low-pass image. The spatial frequency band represented by such a third detail image lies mainly below the spatial frequency range of the second detail image but above the spatial frequency range of the third low-pass image. The third decomposition level is succeeded by further decomposition levels, the detail images then produced representing each time spatial frequencies which are lower than those of the detail image of the preceding decomposition level.

The detail images and the residual image are added after at least one of the detail images has been modified. The aim is to enhance the diagnostically relevant image information and to suppress the image information which is not important for the diagnosis or has a disturbing effect.

EP-A 527 525 describes two alternatives for the modification of the detail images:

a) According to a first alternative, the image values of a detail image are multiplied, one pixel after the other, by a factor which is dependent on an image value of a pixel having corresponding co-ordinates in a low-pass image whose spatial frequency range is below the spatial frequency band of the detail image. For small image values in this low-pass image (corresponding to bright image areas in the case of an X-ray image) the factor derived from a look-up table is smaller than 1, whereas it is larger than 1 for large image values. This reduces the contrast in the bright image areas where noise is particularly disturbing whereas the contrast in the darker image areas is enhanced. However, the reduction and the enhancement are carried out independently of the image values in the detail image. The noise in these image areas, therefore, is reduced in the same manner as the useful information contained in the larger image values.

b) According to the second alternative the image values of at least one detail image are modified in dependence on their magnitude, in conformity with a non-linear characteristic, so that the very small image values (corresponding to the noise) are attenuated, moderately small image values are enhanced and larger image values remain the same. However, this modification is performed irrespective of the fact whether the image value is associated with a pixel which lies in the bright or in the dark image areas. In the darker image areas, in which the effect of noise is less than in the bright image areas, small image values of the detail image are thus attenuated in relation to the larger image values. This method has the drawbacks that it is not robust in relation to noise pulses which no longer lie in the range of the very low contrasts but in the range of moderately low contrasts and hence are even intensified, whereas useful information in the range of very low contrasts is attenuated in any case.

Citation of a reference herein, or throughout this specification, is not to construed as an admission that such reference is prior art to the Applicant's invention of the invention subsequently claimed.

SUMMARY OF THE INVENTION

It is an object of the present invention to provide a method of the kind set forth whereby the image quality can be enhanced even further. This object is achieved according to the invention in that the modification of an image value corresponds to multiplication of this image value by a factor which is dependent on this image value itself as well as on the mean image value and/or on the variation of the image values in a window around the relevant pixel in the original image or an image derived therefrom.

The invention is based on the recognition of the fact that optimum image quality can be achieved only if the modification of the image values is dependent on the relevant image value itself as well as on the mean image value and/or the variation of the image values in a window around the relevant pixel in the original image or an image derived therefrom. This enables, for example, the small image values in a detail image to be intensified in relation to the larger image values when they are associated with a pixel which is situated in a dark image area, whereas they are not intensified when the relevant pixel is situated in a bright image area.

The invention is also based on the recognition of the fact that instead of being dependent on the mean image value (being the same as the density of the image) in a window around the relevant pixel, the modification may also be dependent on the variation of the image values in such a window; this is notably so when the aim is to avoid enhancement of the noise upon enhancement of the contrast. This is because in image areas in which the image values vary strongly the noise is not observed as clearly as in image areas with only a slight variation of the image values.

One possibility of implementing the invention would be to provide a look-up table in which a factor is stored for each image value of a pixel and for each density (mean image value) in a window around this pixel. Taking up such a dual dependency in a look-up table, however, would be very intricate and modifications of such a dual dependency could be implemented only at great expenditure.

Therefore, in an essentially simpler possibility, the modification includes converting the image values in at least one of the detail images by means of a non-linear characteristic in such a manner that the small image values in the detail image are increased in relation to the larger image values, and controlling the degree of increase of the small image values in the pixels of the detail image in dependence on the mean image value and/or the variation of the image values in a window around the relevant pixel in the original image or an image derived therefrom. The small image values in the detail image (i.e. the low contrasts) are then enhanced first. However, the extent of enhancement is controlled in dependence on the density (and/or the variation of the image values). This control may be defined in such a manner that contrast enhancement takes place only in dark image areas and not in bright image areas. Even though the noise is not reduced in this manner, it is not intensified either by the contrast enhancement.

In a particularly simple type of control, controlling the degree of increase of the image values of each pixel further comprises the weighted summing of the image value in the detail image and in the converted detail image with a factor which is dependent on the mean image value and/or on the variation of the image values in a window around the relevant pixel in the original image or an image derived therefrom. The detail image is then summed in a weighted fashion before and after the conversion, the weighting being dependent on the density (the mean image value) and/or the variation of the image values in the window around the pixel in the original image or a derived image. When the detail image is weighted by a weighting factor 1 prior to the conversion and by a weighting factor 0 after the conversion, the sum image will not contain contrast enhancement. However, if the detail image is weighted by a weighting factor 0 prior to the conversion and by a weighting factor 1 after the conversion, full contrast enhancement will be realized. Equivalently, the image values of the detail image can be subtracted from one another (one pixel after the other) before and after the conversion and the difference can be added to the non-converted detail image in a weighted fashion.

In a further version which is suitable for the suppression of the noise and is based on the assumption that the essential part of the noise is concentrated in the first detail image with the highest spatial frequencies and possibly also in the second detail image and wherein the images include x-ray images, at least for the detail images with the highest spatial frequency, the factors have values such that the degree of increase is reduced as the density and/or the variation decreases. When the low contrast enhancement is reduced as the density decreases and the variation of the image values decreases, the noise in the image areas which are sensitive in this respect (bright image areas or image areas with a small variation of the image values or high spatial frequencies) will not be increased.

The extent of the image enhancement is thus dependent on the probability that the image signal is amplified and not the noise, or on the probability that any noise which is also amplified is masked. The advantage of this type of noise-robust image enhancement consists in that original image contents are not attenuated.

A device for carrying out the method according to the invention includes an imaging system and an image processing system, wherein the image processing system further comprises means for decomposing the original image further comprising into a series of detail images, each of which contains only a part of the spatial frequencies of the original image, modification means for modifying at least a part of the image values associated with the pixels of at least one of the detail images, means for reconstructing a final image from the possibly modified detail images, wherein the modification means are constructed in such a manner that the modification of an image value corresponds to multiplication of this image value by a factor which is dependent on this image value itself as well as on the mean image value and/or the variation of the image values in a window around the relevant pixel in the original image or an image derived therefrom. The further embodiment, wherein the imaging system further comprises an X-ray source, an X-ray image detector for the imaging of various organs by means of X-rays, and an X-ray generator for controlling the x-ray source, and wherein the image processing system further comprises an image processing unit for processing x-ray images and a storage device in which a respective set of exposure parameters is stored for each of a number of organs, that each set includes, in addition to exposure parameters for the X-ray generator, parameters for the modification of the detail images in dependence on the mean image value and/or the variation of the image values in a window around the relevant pixel in the original image or an image derived therefrom, and that, upon selection of an organ, the modification of the detail images which is stored for the relevant organ is fetched and applied to the image processing unit, relates to an X-ray system with a storage device (data base) in which a respective set of exposure parameters is stored for each of a number of organs. X-ray systems provided with such data bases have since long been known as "APR" (Anatomically Programmed Radiography). Such systems are based on the recognition of the fact that there is no adjustment of the exposure parameters that is optimum for the imaging of all organs. Because for this type of X-ray exposure the exposure parameters are established any way in an organ-dependent manner, or in dependence on the anatomical region of the patient to be imaged, according to this further embodiment not only the necessary exposure parameters are stored, but also the image processing parameter which is optimum for the X-ray exposure of the relevant anatomical region.

The invention will be described in detail hereinafter with reference to the drawings. Therein:

DETAILED DESCRIPTION OF THE PREFERRED EMBODIMENT

Figure 1:
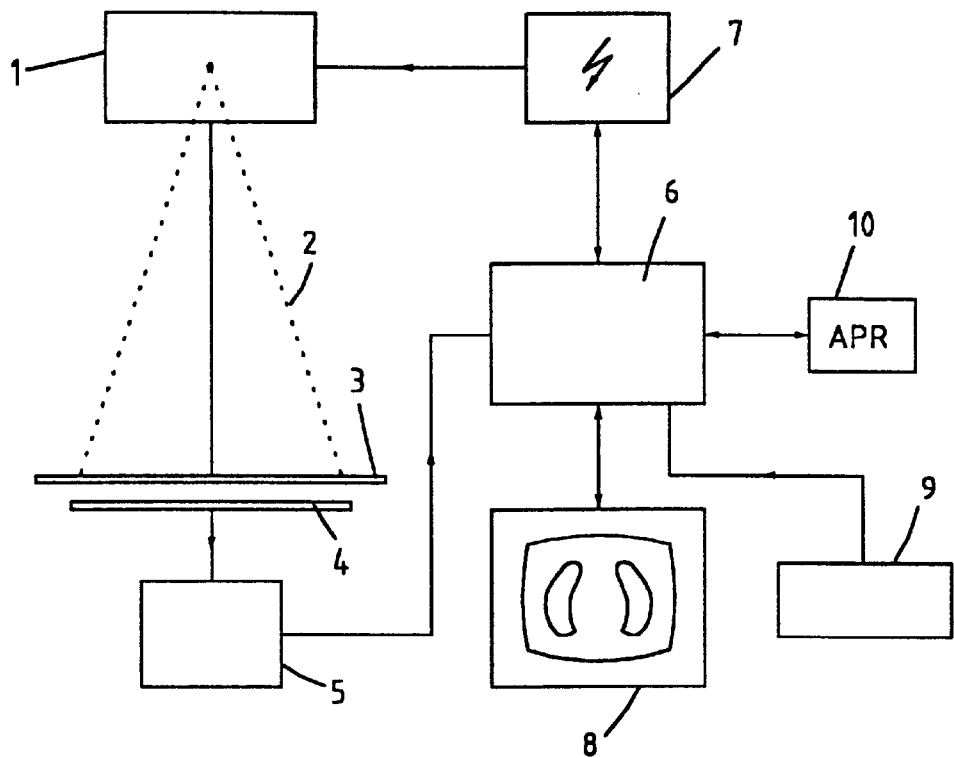
FIG. 1 shows an X-ray imaging apparatus with an image processing device according to the invention.

The reference numeral 1 in FIG. 1 denotes an X-ray source which emits a radiation beam 2 which irradiates a patient (not shown) who is arranged on a patient table which is represented by a table top 3; this beam is incident on an image detector 4 which converts the incident X-ray intensity into electric signals in a location-dependent manner.

The X-ray detector 4 may consist of, for example a plurality of X-ray sensitive detector elements which are arranged in the form of a matrix and generate electric signals whose amplitude corresponds to the intensity of the X-rays incident thereon. However, the image detector may also include a photoconductor on which a charge pattern which is dependent on the X-rays is produced, said charge pattern being electrostatically scanned. Finally, an image detector may also be provided in the form of a storage phosphor in which the X-rays produce a latent image which can be read out by means of a laser so as to be digitized. The actual physical construction of the image detector is not relevant to the invention; it is only important that the X-ray image can be converted into a series of digital data words which represent the image values at the individual pixels of an original image.

The image detector 4 is read out by means of an appropriate reading apparatus 5 which produces a series of digital values, each of which corresponds to an image value of the source image. The reading apparatus 5 may be constructed in such a manner that it already eliminates the artefacts imposed by the image detector and already performs, for example a contrast harmonization operation whereby the dynamic range of the coarse structures in this image is reduced.

The digital values produced by the reading apparatus 5 are applied to a workstation 6 which on the one hand performs image processing and on the other hand controls an X-ray generator 7 whereto the X-ray source 1 is connected. The workstation 6 co-operates with a monitor 8 on which an X-ray image can be displayed, but which can also display the state of the system, for example the X-ray voltage active in the X-ray source, the exposure duration or the body region to be imaged during the next X-ray exposure. There is also provided an input unit 9 via which the user can enter control instructions. Finally, the workstation 6 co-operates with an APR data base which is stored in a memory 10 and which may contain on the one hand the exposure parameters and on the other hand control parameters for a subsequent image processing operation, i.e. each time for different organs or different anatomical regions.

Figure 2:
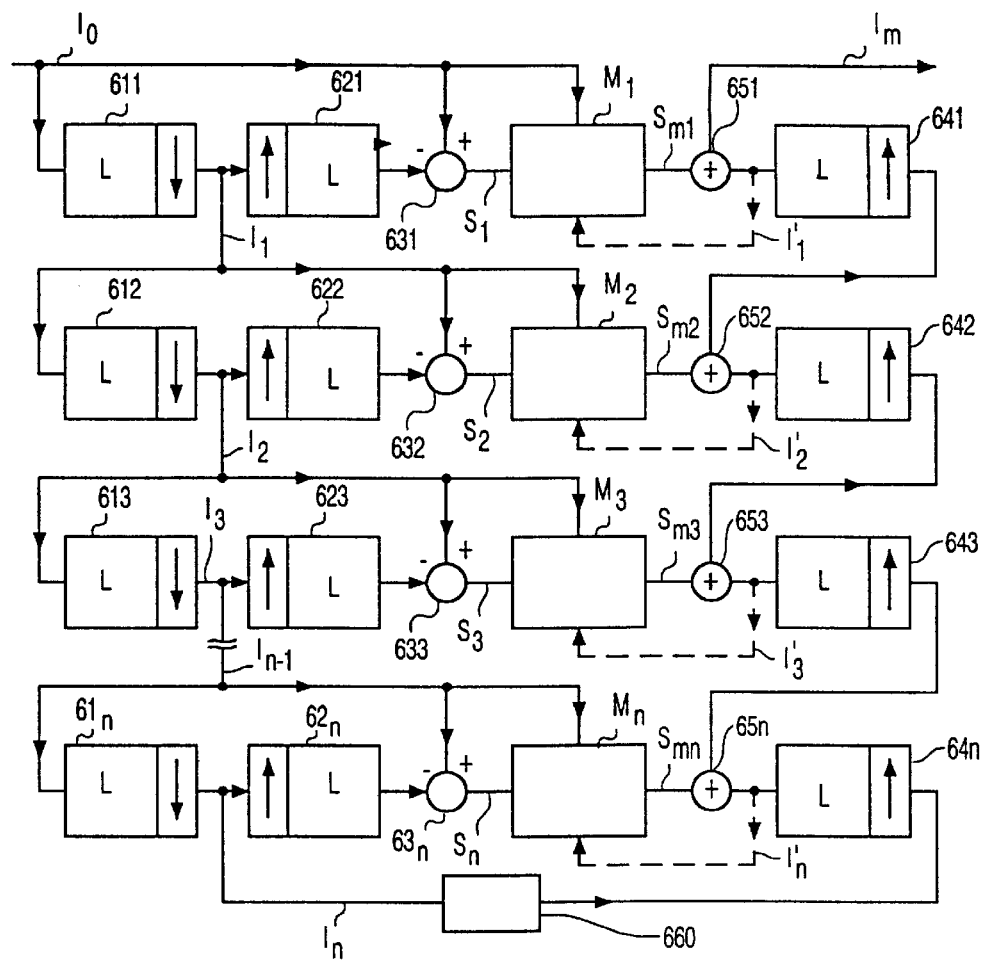
FIG. 2 shows a block diagram illustrating the image processing.

The processing of an original image $I_o$ in the workstation 6 will be described in detail hereinafter with reference to the block diagram of FIG. 2. The original image $I_o$ is first subjected to a low-pass filtering operation in the block 611; the upper spatial frequency which remains after the low-pass filtering operation then amounts to half the maximum spatial frequency that may be present in the original image $I_0$. As is denoted by the downwards pointing arrow, at the same time sub-sampling is performed in that the low-pass image is calculated for only every second pixel in the row direction and in the column direction. The low-pass image $I_1$ thus produced is applied inter alia to a stage 621 in which on the one hand the number of pixels is increased in that a row or a column of zeros is inserted, for example between every two rows or columns of the low-pass image $I_1$ and that the image thus obtained is convoluted with a low-pass kernel. The image at the output of the stage 621, therefore, essentially corresponds to the image which would be obtained if every second row and column had not been eliminated in the stage 611 after the low-pass filtering operation. However, this low-pass image contains exactly as many pixels as the original image $I_0$ wherefrom it has been derived. In the block 631 this low-pass image is subtracted, one pixel after the other, from the original image $I_0$. The subtraction image thus obtained represents the first detail image $S_1$ which contains only the higher spatial frequencies of the image $I_0$ wherefrom it has been derived.

At a second decomposition level the low-pass image $I_1$, representing the lower half of the frequency spectrum of the original image, is processed in the same way as the original image $I_o$ at the preceding decomposition level. The image is thus subjected to a low-pass filtering operation in a stage 612 and at the same time the number of pixels in the row direction and the column direction is halved again, resulting in a low-pass image 12 in which the number of rows and columns has again been reduced by a factor of 2 and which, in relation to the original image, contains only the lower quarter of the frequency spectrum. The low-pass image 12 is interpolated again in a stage 622 in such a manner that there is obtained a low-pass image which contains the same number of pixels as the low-pass image $I_1$. In the block 632 the low-pass image produced subsequent to the block 622 is subtracted from the image $I_1$ wherefrom it has been derived, resulting in a second detail image $S_2$. In relation to the original image this detail image represents the upper half of the spatial frequency band which adjoins the spatial frequency band contained in the detail image $S_1$; however, it does not contain the spatial frequency range contained in the low-pass image $I_2$.

At a third decomposition level the low-pass image $I_2$ is processed in the same way as the low-pass image $I_1$ is processed at the second decomposition level. This results in a low-pass image $I_3$ (having half the number of rows and columns in comparison with the low-pass image 12) which represents the lower one eighth of the-original spectrum, as well as in a detail image $S_3$ whose spatial frequency band adjoins the spatial frequency band of the detail image $S_2$. The decomposition process may comprise n of such identically configured decomposition levels. 7 or 8 are typical values for n. This means that the low-pass image $I_n$ (which may also be referred to as the residual image) replaces 128 or 256 rows or columns in the original image by a single row or column.

As is known, the original image $I_0$ could be completely reconstructed from the residual image $I_n$ and the detail images $S_1 \ldots S_n$ if the images are added after ensuring, by way of interpolation, that the images to be added have the same numbers of rows and columns. To this end use is made of the interpolation stages 641 ... 64n at the decomposition levels and also of the addition stages 651, 652, 653 and 65n which succeed these interpolation stages at the individual levels. This reconstruction process is described in detail in the cited document which is incorporated herein by way of reference in order to avoid unnecessary repetition.

Figure 3:
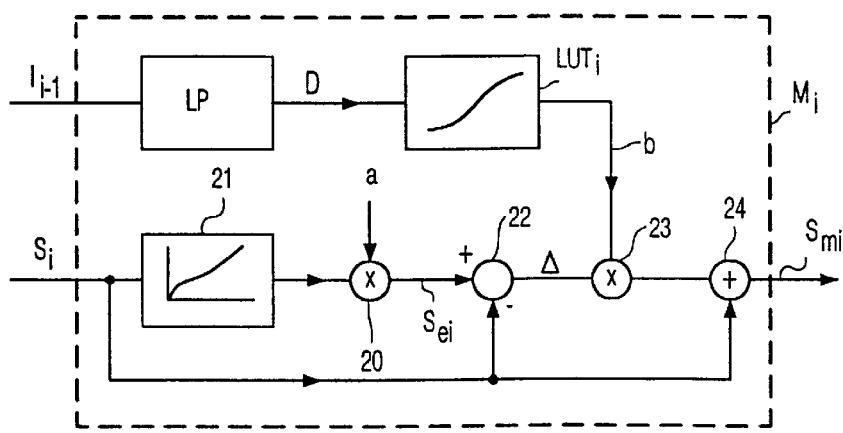
FIG. 3 shows a block diagram of the modification stage included therein.

However, because at least one of the detail images $S_1 \ldots S_n$ is modified by a modification stage $M_1, M_2, M_3 \ldots M_n$, resulting in modified detail images $S_{m1}, S_{m2}, S_{m3}, \ldots, S_n$, the final image $I_m$ produced by the reconstruction deviates from the original image $I_0$. FIG. 3 shows a modification stage $M_i$ (i=1, 2, 3, ..., n).

Figure 4:
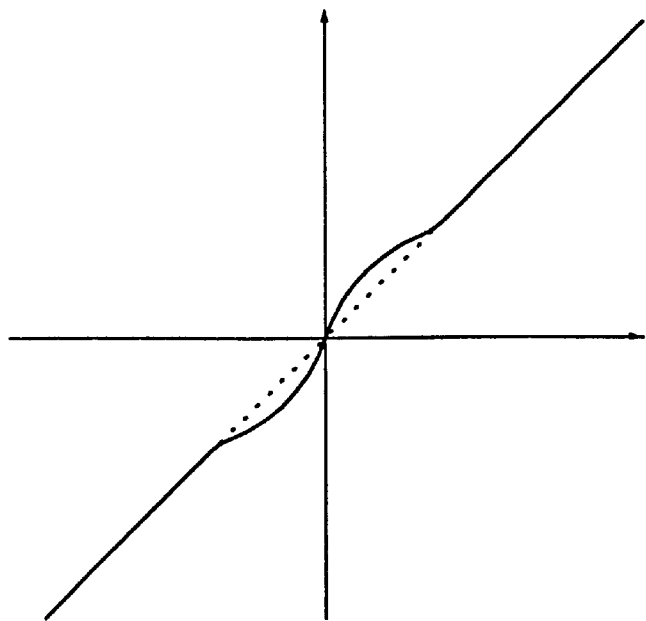
FIG. 4 shows a characteristic for enhancement of the low contrasts.

The image value of each pixel in the detail image $S_i$ is transformed in a stage 21 (FIG. 3) having a non-linear transfer characteristic. This is performed in the simplest manner by means of a look-up table which associates each image value $S_i$ at its input with a possibly modified image value $S_{ei}$ at its output. FIG. 4 shows the typical variation of the non-linear characteristic (the abscissa being the image value $S_i$ and the ordinate the image value $S_{ei}$) in conformity with the block 21, but the width of the enhanced area and the degree of enhancement could be different for the various modification stages. It appears that large image values remain the same whereas smaller image values (which could correspond to the noise in the first detail image) are enhanced relative to the larger image values. Because the images values of the detail images represent the contrast of the original image in the relevant spatial frequency range, the indicated transfer characteristic provides an enhancement of the low contrasts in the relevant image.

Subsequently, the image value of each pixel in the detail image $S_i$ is multiplied by a factor larger than 1 in a multiplication stage 20. This means that in relation to the residual image $I_n$ this detail image $S_i$ is enhanced (if the modification stages $M_{i+1} \ldots M_n$ do not include this multiplication, but also in relation to the detail images of the subsequent decomposition levels $S_{i+1} \ldots S_n$). This multiplication and the associated accentuation of the higher spatial frequencies, however, may possibly be omitted or carried out already in the reading unit 5.

Subsequently, in the stage 22 the difference $\Delta$ is formed between the image value at the output of the stage 21 and the image value associated with the same pixel in the detail image $S_i$. In a multiplier stage 23 the difference $\Delta$ is multiplied by a factor b which lies between 0 and 1. The multiplied difference value $b\Delta$ is added to the image value $S_i$ (block 24) and hence forms an image value of the modified detail image $S_{mi}$. When the factor b=0, the image value corresponds, after the addition in the block 24, exactly to the value in the detail image $S_i$. The contrast enhancement in the block 21 then has no effect. However, if b has the value 1, the contrast enhancement is fully effective.

The factor b is derived from an image which contains, for each pixel in the detail image $S_i$, a value which corresponds to the mean brightness at the relevant location. For example, for this purpose use can be made of the original image $I_{i+1}$ wherefrom the detail image $S_i$ is derived, because this image contains exactly as the same number of pixels as the detail image. This image is subjected to a low-pass filtering operation for which the mean image value, i.e. the density D, is taken into account in a window of, for example 5×5 pixels, at the center of which there is situated the same pixel whose image value is subjected to the relevant low contrast enhancement in the block 21. However, as is denoted by dashed lines (FIG. 2) alternatively the image $I_i'$ from the reconstruction path (i.e. from the output of the interpolation stage $64_i \ldots i=1, 2, 3$) can be used for control, so that the low-pass filtering in the block 25 can be dispensed with. This is effective notably when the residual image $I_n$ is subjected to a density correction by way of an additional density correction stage 660 (for example, in conformity with a film curve). The filtered image value corresponding to the density D is then applied to a look-up table $LUT_i$ which assigns a value b to each value D.

The degree of contrast enhancement is thus dependent on the density in a window around the relevant pixel as well as on the variation of the characteristic stored in the look-up table $LUT_i$. Hereinafter it will be described how the noise intensification can be limited and, in addition, the contrast enhancement can be controlled in an organ-specific manner. The latter will be successful subject to the condition that a distinction can be made between organs by means of criteria in respect of density and detail size. Such organ-specific control of the contrast enhancement is feasible and desirable notably for lung exposures.

Figure 6:
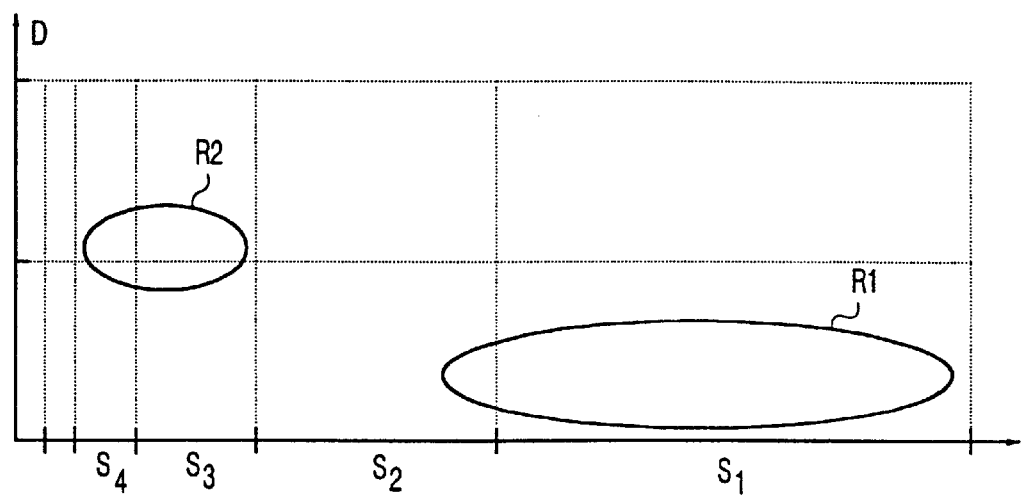
FIG. 6 shows a density/spatial frequency diagram.

For a further explanation reference is first made to FIG. 6 which shows a diagram with the density D as the ordinate and the spatial frequency bands of the individual detail images as the abscissae. This diagram shows a region $R_1$ which is situated in the detail images $S_1$, $S_2$ having the highest spatial frequencies at the lowest density. The associated density range corresponds to a low radiation dose in an X-ray image. Because of the non-linear, generally logarithmic relationship between the radiation dose and the density, it will be known that the noise becomes most manifest in this region.

FIG. 6 also shows a second region $R_2$ which corresponds to a mean density or a mean brightness and is situated in a lower spatial frequency range, for example in the detail images $S_3$ and $S_4$. In the case of a lung exposure using customary resolutions of 0.2 mm, a major part of the lung vessels will be reproduced in this region. If the low contrasts are enhanced in this region, a pathological image impression may be obtained even in the case of healthy lungs. However, in the same spatial frequency range the contrast of the structures in the lower density range should be enhanced. In this range there are situated, for example structures which are masked by mediastinum and heart shadows so that they are poorly visible. At the same time the effect of noise is not very significant in this spatial frequency range.

Figure 5A:
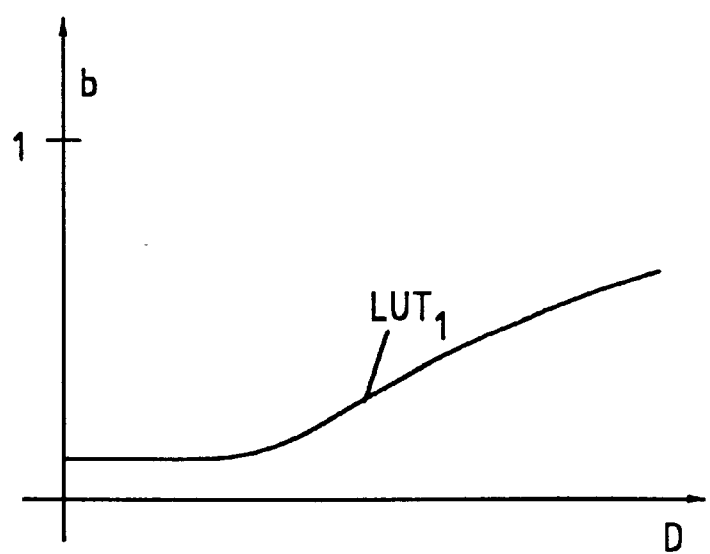
FIGS. 5a, 5b show various characteristics for controlling the low contrast enhancement.
Figure 5B:
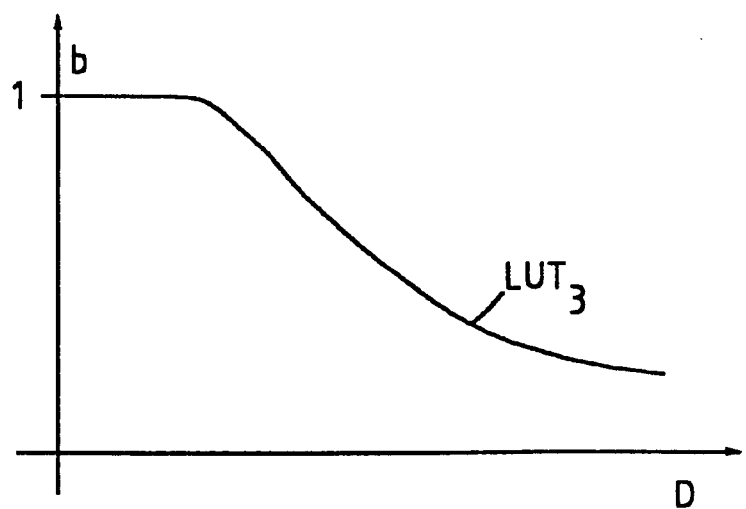

The FIGS. 5a and 5b show the necessary characteristics which are stored in the look-up tables $LUT_i$ of the modification stages.

FIG. 5a shows the control characteristic for the highest spatial frequency band $S_1$ (and possibly $S_2$). In the case of a low density, the value of the factor b will be lower, i.e. the contrast enhancement produced by the characteristic according to FIG. 4 will hardly be effective at the output of the stage 24. The low contrasts in the range of $R_1$, notably the noise, therefore, are not enhanced. The noise is not reduced, but practically not intensified either, as would be the case if all low contrasts were enhanced. The factor b may increase towards the higher density values and hence also the extent to which the contrast enhancement is effective. In this density range the noise generally is not as disturbing as in the lower density range.

FIG. 5b, however, shows a characteristic as it may be contained in the look-up table $LUT_3$ for the modification in the block $M_3$. The factor b is large for lower values of the density. As a result, the low contrast enhancement becomes fully effective for low densities in the X-ray image (so in the region of the mediastinum, the cardiac shadow and the abdomen). As is shown in FIG. 5b the factor b continuously decreases towards the higher values of the density, so that the low contrast enhancement becomes far less effective in the density range in which the lung vessels are mainly reproduced.

The characteristic shown in FIG. 5b is thus very suitable for lung exposures. Other exposures, however, may require a completely different characteristic. The optimum curves or image processing parameters for different organs should, therefore, be stored, at least for some of their supporting points, in the APR data base 10 and, upon selection of the organ to be imaged, they should be fetched by the examiner for the subsequent image processing.

Figure 7:
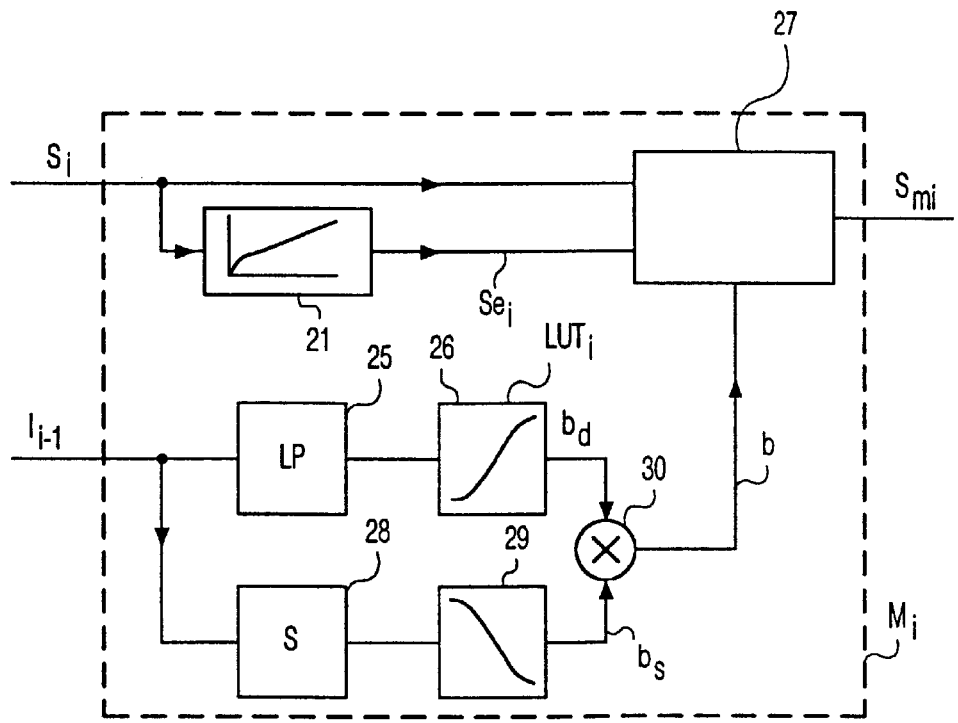
FIG. 7 shows a further embodiment of the modification stage.

FIG. 7 shows another embodiment of the modification stage $M_i$. The detail image $S_i$ is again subjected to low contrast enhancement in the block 21. The resultant detail image with enhanced contrast $S_{ei}$ is combined, pixel by pixel, with the detail image $S_i$ in a combination stage 27. The following equation then holds for the modified ultimate image:

$$S_{mi} = b \cdot S_{ei} + (1-b) \cdot S_i \quad (1)$$

Such weighted summing of $S_e$ and $S_{ei}$ is equivalent to the combination shown in FIG. 3, first the difference Δ between the contrast enhanced detail image $S_{ei}$ and the detail image $S_i$ itself being formed, after which the difference Δ is added with the weight b to the detail image $S_i$.

The value b then appears as the product of the factors $b_d$ and $b_s$, $b_d$ being determined in the same way as the factor b in FIG. 3. The factor bs is dependent on the variation of the image values in a window around the pixel being processed at that instant in conformity with the equation 1. In the case of a slight variation of the image values, the factor b, is small whereas it is large in the case of a strong variation. The fact that the noise for a pixel in an environment in which the image values vary strongly is less disturbing than in the case of a pixel in an environment in which the image values vary only slightly is thus taken into account. The variation of the image values can then be determined in various ways. Three degrees of variation are given hereinafter by way of example.

As a first example the standard deviation $$T = \sqrt{\frac{1}{F} \sum_c (\langle BW(S_i) \rangle - BW(S_i))^2} \quad (2)$$

is given. Therein, $BW(S_i)$ denotes an image value of $S_i$ and $\langle BW(S_i) \rangle$ denotes the mean value of the image values in a local window around an observed pixel. C denotes all pixels which are present in a local window of size F around the relevant pixel. In addition to the standard deviation, of course, all other indicators of the statistic fluctuation width, for example, the higher moments, constitute suitable measures for the variation of the image values. Histogram-based steps which are determined in conformity with the following relation are equally suitable:

$$T = -\sum_{g_u}^{g_o} f(p_g) \quad (3)$$

Therein, $p_g$ is the fraction of the pixel having the image value g, and $g_u$ and $g_o$ represent the minimum and the maximum grey value, respectively. $f(p_g)$ is a strictly convex function for which, for example the following relation may hold:

$$f(p_g) = p_g \cdot \log p_g \quad (4)$$

or the relation $$f(p_g) = p_g^2 \quad (5)$$

In the case of the variation measures T, mentioned by way of example (equations 2 and 3), a slight variation of the image values results in a small value for T whereas a large variation yields a large value.

After the determination of the value T for the relevant pixel in conformity with the equations 2 or 3 and 4 or 5 in the block 28, using a look-up table 29 a value $b_s$ is associated with each value T determined, said value $b_s$ being large for a large value of T and small for a small value of T. The values for $b_d$ and $b_s$ are then multiplied by one another in the block 30, thus yielding the factor b for the relevant pixel. The essential difference with respect to FIG. 3 consists in that the value $b_s$ is also taken up in the factor b.

However, it is also possible to make the factor b dependent exclusively on the variation of the image values in a window around the relevant pixel. The blocks 25 and 26 could then be dispensed with. The insensitivity to noise would then also be obtained for other medical images (for example, MR images), irrespective of whether the noise is more visible in bright image areas than in dark image areas.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A method for processing an original image comprising:
   decomposing the original image into a series of detail images, each of which contains only a part of the spatial frequencies of the original image,
   modifying at least a part of the image values associated with the pixels of at least one of the detail images, and
   reconstructing a final image from the possibly filtered detail images, wherein the modification of an image value corresponds to multiplication of this image value by a factor which is dependent on this image value itself as well as on the mean image value and/or on the variation of the image values in a window around the relevant pixel in the original image or an image derived therefrom.

2. A method as claimed in claim 1 wherein the step of modifying further comprises:
   converting the image values in at least one of the detail images by means of a non-linear characteristic in such a manner that the small image values in the detail image are increased in relation to the larger image values, and
   controlling the degree of increase of the small image values in the pixels of the detail image in dependence on the mean image value and/or the variation of the image values in a window around the relevant pixel in the original image or an image derived therefrom.

3. A method as claimed in claim 2 wherein the step of controlling the degree of increase of the image values of each pixel further comprises the weighted summing of the image value in the detail image and in the converted detail image with a factor which is dependent on the mean image value and/or on the variation of the image values in a window around the relevant pixel in the original image or an image derived therefrom.

4. A method as claimed in claim 3 wherein the original image comprises an X-ray image, and wherein at least for the detail images with the highest spatial frequency the factors have values such that the degree of increase is reduced as the density and/or the variation decreases.

5. A device for for processing an original image comprising:
   an imaging system and
   an image processing system, wherein the image processing system further comprises:
      means for decomposing the original image further comprising into a series of detail images, each of which contains only a part of the spatial frequencies of the original image, modification means for modifying at least a part of the image values associated with the pixels of at least one of the detail images, means for reconstructing a final image from the possibly modified detail images, wherein the modification means are constructed in such a manner that the modification of an image value corresponds to multiplication of this image value by a factor which is dependent on this image value itself as well as on the mean image value and/or the variation of the image values in a window around the relevant pixel in the original image or an image derived therefrom.

6. A device as claimed in claim 5 wherein the imaging system further comprises an X-ray source, an X-ray image detector for the imaging of various organs by means of X-rays, and an X-ray generator for controlling the x-ray source, and wherein the image processing system further comprises an image processing unit for processing x-ray images and a storage device in which a respective set of exposure parameters is stored for each of a number of organs, that each set includes, in addition to exposure parameters for the X-ray generator, parameters for the modification of the detail images in dependence on the mean image value and/or the variation of the image values in a window around the relevant pixel in the original image or an image derived therefrom, and that, upon selection of an organ, the modification of the detail images which is stored for the relevant organ is fetched and applied to the image processing unit.

* * * * *